(12) United States Patent
Hida

(10) Patent No.: US 11,727,670 B2
(45) Date of Patent: Aug. 15, 2023

(54) DEFECT DETECTION METHOD AND APPARATUS

(71) Applicant: FUJITSU LIMITED, Kawasaki (JP)

(72) Inventor: Yusuke Hida, London (GB)

(73) Assignee: FUJITSU LIMITED, Kawasaki (JP)

( * ) Notice: Subject to any disclaimer, the term of this patent is extended or adjusted under 35 U.S.C. 154(b) by 286 days.

(21) Appl. No.: 17/232,765

(22) Filed: Apr. 16, 2021

(65) Prior Publication Data

US 2021/0374928 A1    Dec. 2, 2021

(30) Foreign Application Priority Data

May 26, 2020   (EP) ..................................... 20176620

(51) Int. Cl.
*G06K 9/00*      (2022.01)
*G06V 10/75*     (2022.01)
(Continued)

(52) U.S. Cl.
CPC ........ *G06V 10/751* (2022.01); *G06F 18/2148* (2023.01); *G06N 3/045* (2023.01);
(Continued)

(58) Field of Classification Search
CPC ............... G06V 10/751; G06V 10/764; G06V 10/7753; G06V 10/82; G06V 2201/06;
(Continued)

(56) References Cited

U.S. PATENT DOCUMENTS

2018/0028294 A1*   2/2018   Azernikov ........ G06F 18/24143
2018/0314716 A1*   11/2018   Kim .......................... G06T 1/20
(Continued)

OTHER PUBLICATIONS

Extended European Search Report dated Oct. 27, 2020 in corresponding European Patent Application No. 20176620.1 (9 pages).
(Continued)

*Primary Examiner* — Samir A Ahmed
(74) *Attorney, Agent, or Firm* — Staas & Halsey LLP

(57) ABSTRACT

A computer implemented method including acquiring a live image of a subject physical sample of a product or material; inputting the live image to a trained generator neural network to generate a defect-free reconstruction of the live image; comparing the defect-free reconstruction of the live image with the live image to determine a difference; and identifying a defect corresponding to the subject physical sample at a location of the determined difference. An unsupervised training of the generator neural network includes acquiring a set of images of the subject defect-free physical sample; executing a training phase including a plurality of training epochs, in which: training data images are synthesized by superimposing, onto each member of the set of images of subject defect-free physical sample as a respective parent image, defect image data; the synthesized training data images are reconstructed by the generator neural network which is iteratively trained to minimize a loss function between each reconstruction of the reconstructing of the synthesized training data images and the respective parent image of defect-free physical sample and increase an amount of difference between a training data image and the respective parent image caused by the superimposed defect image data from a minimum to a maximum as a function of a training condition.

15 Claims, 11 Drawing Sheets

(51) Int. Cl.
*G06N 3/088* (2023.01)
*G06T 7/00* (2017.01)
*G06F 18/214* (2023.01)
*G06N 3/045* (2023.01)
*G06V 10/764* (2022.01)
*G06V 10/774* (2022.01)
*G06V 10/82* (2022.01)

(52) U.S. Cl.
CPC ............. *G06N 3/088* (2013.01); *G06T 7/001* (2013.01); *G06V 10/764* (2022.01); *G06V 10/7753* (2022.01); *G06V 10/82* (2022.01); *G06T 2207/20081* (2013.01); *G06T 2207/20084* (2013.01); *G06T 2207/20212* (2013.01)

(58) Field of Classification Search
CPC ............. G06F 18/2148; G06F 18/2433; G06F 18/214; G06N 3/045; G06N 3/088; G06T 7/001; G06T 2207/20081; G06T 2207/20084; G06T 2207/20212; G06T 7/0004; G06T 1/20
See application file for complete search history.

(56) References Cited

U.S. PATENT DOCUMENTS

2019/0090056 A1* 3/2019 Rexach .............. G01N 33/1826
2019/0347556 A1* 11/2019 Yim ........................ G06F 18/22

OTHER PUBLICATIONS

Zhao et al.; "A Surface Defect Detection Method Based on Positive Samples"; Jul. 27, 2018; Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine Le, XP047481215, retrieved on Jul. 27, 2018 (9 pages).

Mei et al.; "Automatic Fabric Defect Detection with a Multi-Scale Convolutional Denoising Autoencoder Network Model"; Sensors; vol. 18, No. 4, Apr. 2, 2018, p. 1064, XP055698540; (18 pages).

Ponti et al.; "Everything 1-15 You Wanted to Know about Deep Learning for Computer Vision but were Afraid to Ask"; 2017 30th Sigraphi Conference on Graphics, Patterns and Images Tutorial, Oct. 17, 2017, pp. 17-41, XP033296318, (25 pages).

* cited by examiner

| Data | carpet | grid | leather | tire | wood | brittle | cable | ceramic | pressure | buried | mill | screw | leaky pipes | paper |
|---|---|---|---|---|---|---|---|---|---|---|---|---|---|---|
| worked example | 1.00 | 0.99 | 0.99 | 0.97 | 0.94 | 0.96 | 0.94 | 0.97 | 0.99 | 0.93 | 0.95 | 0.99 | 0.99 | 0.95 |
| prior art A | 0.87 | 0.94 | 0.78 | 0.59 | 0.73 | 0.93 | 0.82 | 0.94 | 0.97 | 0.89 | 0.91 | 0.96 | 0.92 | 0.88 |
| prior art B | 0.59 | 0.90 | 0.75 | 0.51 | 0.73 | 0.86 | 0.86 | 0.88 | 0.95 | 0.86 | 0.85 | 0.96 | 0.93 | 0.77 |
| prior art C | 0.54 | 0.58 | 0.64 | 0.50 | 0.62 | 0.86 | 0.78 | 0.84 | 0.87 | 0.76 | 0.87 | 0.80 | 0.90 | 0.78 |

FIGURE 10

DEFECT DETECTION METHOD AND APPARATUS

CROSS-REFERENCE TO RELATED APPLICATIONS

This application is based on and hereby claims priority under 35 USC 119 to European Patent Application No. 20176620.1, filed on May 26, 2020, in the European Patent Office, the entire contents of which is incorporated herein by reference.

FIELD

The present invention lies in the field of defect identification. In particular, the invention relates to the use of machine learning algorithms to automate defect detection and identification.

BACKGROUND

Material manufacturing companies are constrained under very strict standards. In order to provide the highest quality materials possible while producing always more complex components, manufacturers have to control their own products efficiently. To do so, non-destructive testing (NDT) has been used. NDT covers a wide group of analysis techniques used in science and technology industry to evaluate the properties of a material, component or system without causing damage. However, in an automatized production lane, inspection processes are the bottleneck, and hence increase production costs.

Manufacturers capture a large amount of data by imaging the products, but as they are not labelled, human input is required in the inspection process.

Existing techniques for automating material surface inspection can be categorized in two ways:

- Firstly, to create a large dataset of human labelled images, which is extremely laborious, and is limited by the expertise of the annotator.
- Secondly, create a hand crafted algorithm. This technique applies computer vision methods over an unlabelled dataset and evaluating an algorithm over a small labelled dataset. Such techniques suffer from the difficulty in engineering an effective algorithm.

SUMMARY

The invention is defined in the independent claims, to which reference should now be made. Further features are set out in the sub claims.

Embodiments include a computing apparatus configured for processing images of physical samples to identify defects on the imaged physical samples, by executing on processing hardware and memory hardware a process including executing unsupervised training of a generator neural network to generate defect-free reconstructions of input images; acquiring a live image of the subject physical sample; inputting the live image to the trained generator neural network to generate a defect-free reconstruction of the live image; comparing the defect-free reconstruction of the live image with the acquired live image to determine a difference; and identifying a defect corresponding to the subject physical sample at a location of the determined difference. The unsupervised training includes acquiring a set of images from the input images corresponding to the subject defect-free physical sample; executing a training phase including a plurality of training epochs. At each training epoch training data images are synthesized by superimposing, onto each member of the set of images of subject defect-free physical sample as a respective parent image, defect image data; the synthesized training data images are reconstructed by the generator neural network. The generator neural network is iteratively trained to minimize a loss function between each reconstruction of the reconstructing of the synthesized training data images and the respective parent image of defect-free physical sample and increase an amount of difference between a training data image of the training data images and the respective parent image caused by the superimposed defect image data from a minimum to a maximum as a function of a training condition.

BRIEF DESCRIPTION OF THE DRAWINGS

Embodiments will now be described, purely by way of example, with reference to the accompanying drawings, in which:

FIG. 10 shows numeric results of AUC achieved with the worked example compared with state of the art trained generator neural networks.

DETAILED DESCRIPTION

Figure 1:
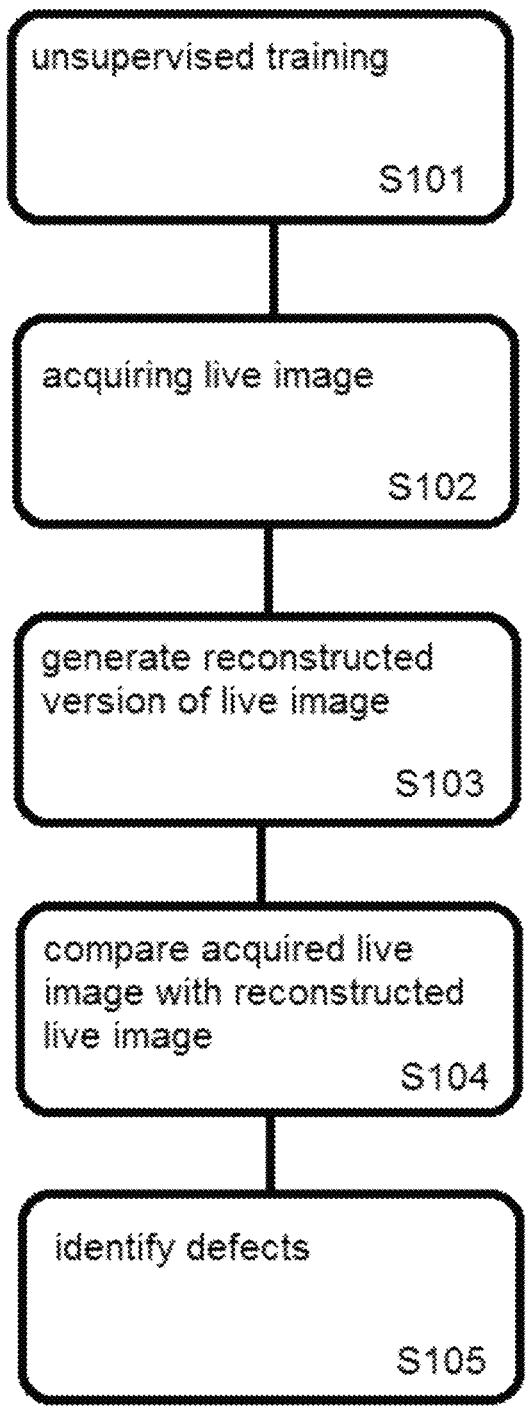
FIG. 1 illustrates a method of an embodiment.

Embodiments provide an automated defect inspection mechanism. Embodiments automatically train a generator neural network to produce defect-free or reduced-defect versions of images of physical samples, which, upon comparison with the actual images, reveal the locations of defects. In this manner, AI-based defect identification can be performed in the absence of labelled training data.

Embodiments use unsupervised artificial intelligence, which means the model (i.e. the generator neural network and loss function) teaches itself to detect defects. Embodiments leverage defect-free, or near defect-free, sample images to train the neural network to remove defects such as scratches, dents, etc, from images, so that by comparison with the original image in which the defects are visible, the defects can be detected. Since the training is automated, the cost of training the system is greatly reduced in comparison with existing techniques. Furthermore, the defects that are detected are not limited by the knowledge of a human trainer.

Anomalies such as random anomalies, real defects, or modified real defects, are illustrated in defect image data, and superimposed onto defect-free data (parent image) to obtain the training data images. Then, the generator neural network (autoencoder) to which the training data images are input is trained in order to remove them. In this training phase, the input to the generator neural network is defect-free images (i.e. parent images) to which defect image data such as artificial anomalies is attached (superimposed), and output is a reconstruction of the training data image without anomalies. The generator neural network which can remove anomalies such as scratches etc., is the trained via this training process.

The comparing is, for example, a visual comparing to create a residual (bitmap or some other representation of differences between the two versions) and find defects. For example, it may be done pixel-wise, block-wise, using some local metrics, or based on pre-trained neural activations, or as some combination of those techniques.

Embodiments are suited for implementation in the manufacturing field, in particular in a production lane, wherein the physical sample of a product or material is a material or component being manufactured. Embodiments are also suited for implementation in the medical field, in which the physical sample is an imaged portion of human or non-human (including inter alia reptiles, birds, animals) tissue, such as a tissue surface, images of internal organs including scans of tissue or electrical activity. Embodiments are also suited for implementation in the field of infrastructure inspection, for identifying defects in structures such as blades of wind turbines (imaged from a drone), or bridges (imaged from a drone), or road surfaces (imaged with a vehicle-mounted camera.

A defect can be anything that stands out from the background (including those instances where the background represented is a regular texture or series of structures) which could also include bumps/dips (which might indicate thickness inconsistencies), decolouration. A defect may be configured not to include specific shapes, such as an animal.

Embodiments manage an amount of change to cause by superimposing defect image data onto a parent image. The amount of change may be managed directly, and may be quantified by a number of changed pixels, or by a number of changed pixels and an quantification of change in pixel value per pixel (for example a summation of such a quantification over all changed pixels). So that, for example, the superimposing includes determining defect image data to superimpose, and optionally also a superimposing condition such as opacity, to cause a required amount of change. Alternatively, it may be that amount of change is managed indirectly, for example because amount of change is directly related to a size or amount of defect image data to superimpose onto the parent image. For example, defect image data may be stored as a plurality of images, each with a substantially equal (i.e. plus minus around 10%) size, so that by managing the number of such defect images that are superimposed, the amount of change is being managed even without being measured. Other aspects of defect image data that could be managed to provide a required amount of change is size, shape, colour, transparency, and the amount of anomalies.

Embodiments provide a specific training technique that reduces losses quickly in relation to the number of training epochs. Embodiments require only defect-free images of physical samples, the defect image data can be randomly generated. Therefore, availability of actual defect image data is not a limitation.

Increased as a function of a training condition means that the increase is dependent upon whether or not a condition is met, the condition being whether a variable representing progress of the training process (for example, completed training epochs, aggregate loss function values over the epoch, stability of configurable weights (and biases)) meets a threshold or not. Wherein meeting of the threshold causes an increase in the difference between the parent images and the respective training data images, and the setting of a new threshold from a series of thresholds.

Optionally, the unsupervised training further comprises: an initial training phase, comprising one or more epochs and preceding the first training phase, in which training data images for the initial training phase consists of each member of the set of images of defect-free physical samples.

Optionally, the initial training phase comprises: the generator neural network reconstructing the training data images for the initial training phase, and the generator neural network is iteratively trained to minimise a loss function between each of the training data images for the initial training phase and the respective reconstruction.

Advantageously, the initial training phase enables the generator neural network to learn latent features corresponding to the normal condition or normal state of the physical samples.

Optionally, the amount of difference between each training data image and the respective parent image is at the maximum for a plurality of training epochs.

Optionally, there may be plural training epochs with the amount of difference between parent images and respective training data image or images at the maximum. Effectiveness of the generator neural network at removing defects may be improved by training with the amount of difference at the maximum. However, losses reduce faster with the gradual ramping up of defect image data according to embodiments. Therefore, effectiveness and fast reduction in losses is achieved by a gradual ramping up of the amount of difference over a number of training epochs, and then a further number of training epochs with the maximum amount of difference.

Optionally, the function is a sigmoidally increasing function or a linearly increasing function.

Different implementation scenarios may benefit from different functions controlling the defect image data to superimpose onto the parent images. Furthermore, computational overheads of training epochs, and time taken to complete the training phase, may also be considered.

The defect image data may comprise individual defect images. The amount of difference between defect-free image (parent image) and synthesized image (training data image) may be controlled in a number of ways. For example, Optionally, the amount of difference between each training data image and the respective parent image is caused by, in the synthesizing for each epoch by superimposing, onto each member of the set of images of defect-free physical samples as a parent image, increasing one or more from among: a number of defect images, a size of defect image, an amount of defect image data, a number of defect image pixels, an average pixel value difference between parent image and defect image, opacity of superimposed defect image data.

Optionally, the defect image data comprises images of products or materials other than the product or material in the set of images of defect-free physical samples, and/or images of computer-generated textures or patterns, and/or images of defects on surfaces of the said product or material in the set of images of defect-free physical samples.

That is, in cases where images of actual defects are available, those images may be used as defect image data. However, since such images can be difficult to obtain, embodiments are flexible and can be implemented with randomly generated textural images, and other computer generated defect images.

Optionally, the defect image data is partially transparent when superimposed onto the respective parent image. Otherwise, the defect image data may be completely opaque. The selection may be dependent upon the implementation scenario and the nature of defects likely to occur. Embodiments can be configured according to the particular product or material being analysed.

The training technique of embodiments is particularly suited to the generator neural network being a convolutional autoencoder.

In an embodiment which is particularly fast in achieving reduction in losses (i.e. particularly effective at training the generator neural network to remove defects from input images), the training phase is modelled on a triplet network. For example, in each training epoch: two training data images are synthesized from each member of the set of images of defect-free physical samples as a parent image, different defect image data being superimposed onto each of the two training data images; the iterative training of the generator neural network comprises, for each parent image, inputting the parent image and the two respective training data images to the generator neural network for reconstruction thereby, the loss function being an aggregation of a plurality of factors, including a first factor, a second factor, and a third factor, the first factor being proportional to a calculated value of a first loss function between the parent image and the reconstructed parent image, the second and third factors being proportional to a calculated value of a second loss function between the parent image and each of the reconstructed training data images, respectively; wherein the first loss function and the second loss function may be the same loss function, or may be different loss functions.

Optionally, each of the first and second loss functions is either one quantitative assessment of a loss between the respective pair of images, or is an aggregation of a plurality of different quantitative assessments of a loss between the respective pair of images.

Optionally, the training condition is: an increase in a count of a number of completed training epochs; an average or aggregate over a training epoch of the loss function between each of the reconstructions of the synthesized training data images and the respective parent image of defect-free physical samples falling below a threshold value among a series of threshold values; adjustable parameters in the generator neural network changing by less than a threshold value among a series of threshold values between a start and end of the latest training epoch; or an assessment of clarity of reconstructions of the synthesized training data images meeting a threshold value among a series of threshold values.

The training condition may be a count of a number of completed training epochs, so that every one of or every n training epochs the amount of difference between the parent image and each training data image is increased. Alternatively, the training condition may be an average or aggregate over a training epoch of the loss function between each of the reconstructions of the synthesized training data images and the respective parent image of defect-free physical samples falling below a threshold value or one of a series of threshold values. A quantification of the loss function over the training epoch is compared with a first threshold, and once the first threshold is met, the amount of difference between the parent images and each training data image is increased (for the forthcoming training epoch), and a new threshold is set. The new threshold may be lower than the first threshold. This process continues for one or a plurality of new thresholds.

Alternatively the training condition may be adjustable parameters in the generator neural network changing by less than a threshold value among a series of threshold values between a start and end of the latest training epoch. That is, a quantification of the change in the adjustable parameters between the start and the end of the training epoch is compared with a first threshold, and once the first threshold is met, the amount of difference between the parent images and each training data image is increased (for the forthcoming training epoch), and a new threshold is set. The new threshold may be lower than the first threshold. This process continues for one or a plurality of new thresholds.

Alternatively the training condition may be an assessment of clarity of reconstructions of the synthesized training data images meeting a threshold value among a series of threshold values. That is, a quantification of an assessment of clarity of reconstructions of the synthesized training data images across the training epoch meeting a threshold value among a series of threshold values. The quantification is compared with a first threshold, and once the first threshold is met, the amount of difference between the parent images and each training data image is increased (for the forthcoming training epoch), and a new threshold is set. The new threshold may be lower than the first threshold. This process continues for one or a plurality of new thresholds.

Such loss function calculations have been found to result in particularly fast training of generator neural networks in embodiments.

Embodiments include an apparatus comprising processor hardware and memory hardware, the memory hardware storing processing instructions which, when executed by the processor hardware, cause the processor hardware to execute a method of an embodiment. The processing hardware may be a CPU or a plurality of interconnected CPUs. The memory hardware may be at least one of volatile and non-volatile memory. The memory hardware is accessible to the processing hardware.

The apparatus may further comprise imaging hardware for acquiring the live image, and a display unit on which locations of the determined differences at which defects are identified are displayed.

Embodiments of another aspect include a computer program which, when executed by a computing apparatus, causes the computing apparatus to execute a method of an embodiment. The computer program may be stored on a computer-readable medium. The computer-readable medium may be non-transitory.

FIG. 1 illustrates a method of an embodiment. The description of the embodiment is written, by way of example, from the broad perspective of a manufacturing environment, and the types of defects typically associated with that field. Embodiments are not limited to such implementation, and may be applied in any technical environment requiring identification of defects in physical samples. For example, embodiments may be applied in any technical field in which there exists a desire to identify anything non-standard on a physical sample. The physical samples may be a sample of a material, with the material surface being imaged. For example, material surface could include human tissue, surface of vegetation, fabric, infrastructure for inspection (turbine blades or bridges using drones, road surface using a vehicle mounted camera). The physical sample may be a sample of a product, which is a particular artificially produced arrangement of a material or materials.

At step S101, an unsupervised training of a generator neural network is executed. S101 comprises executing unsupervised training of a generator neural network to generate defect-free reconstructions of input images. S101 may include automatic (i.e. unsupervised) training of a generator neural network to generate reduced-defect, or defect-free, versions of input training data images of material or product surfaces. Automatic in this context is taken to mean unsupervised, that is, the training is performed in the absence of manual correction of outputs from the neural network. In the training S101, the generator neural network 340 is trained to embed normal state image data in input images.

Figure 2:
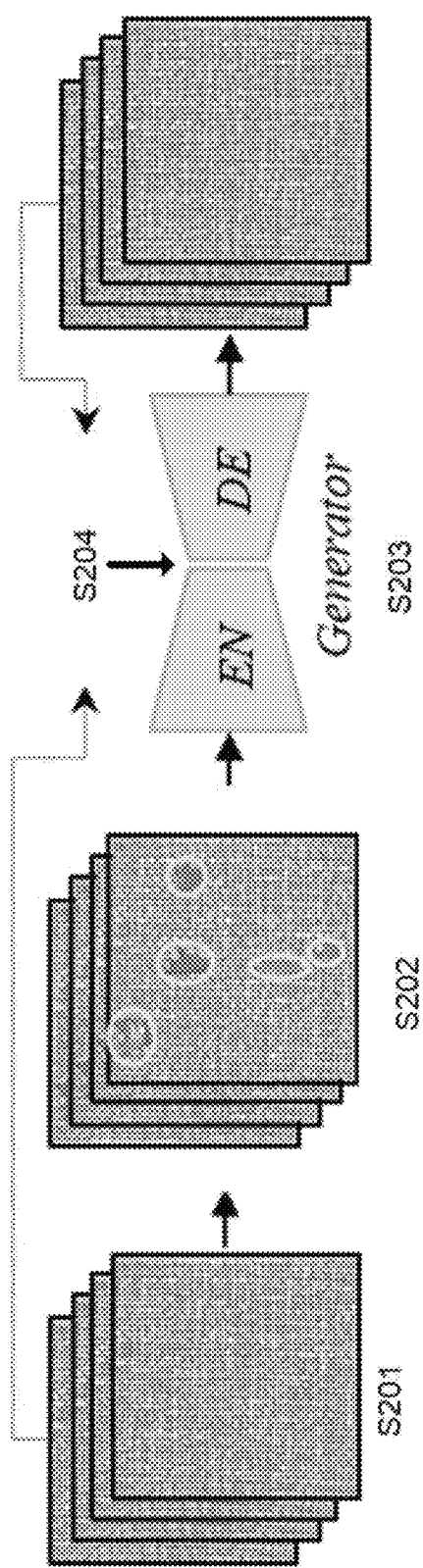
FIG. 2 illustrates an unsupervised training process.
Figure 3:
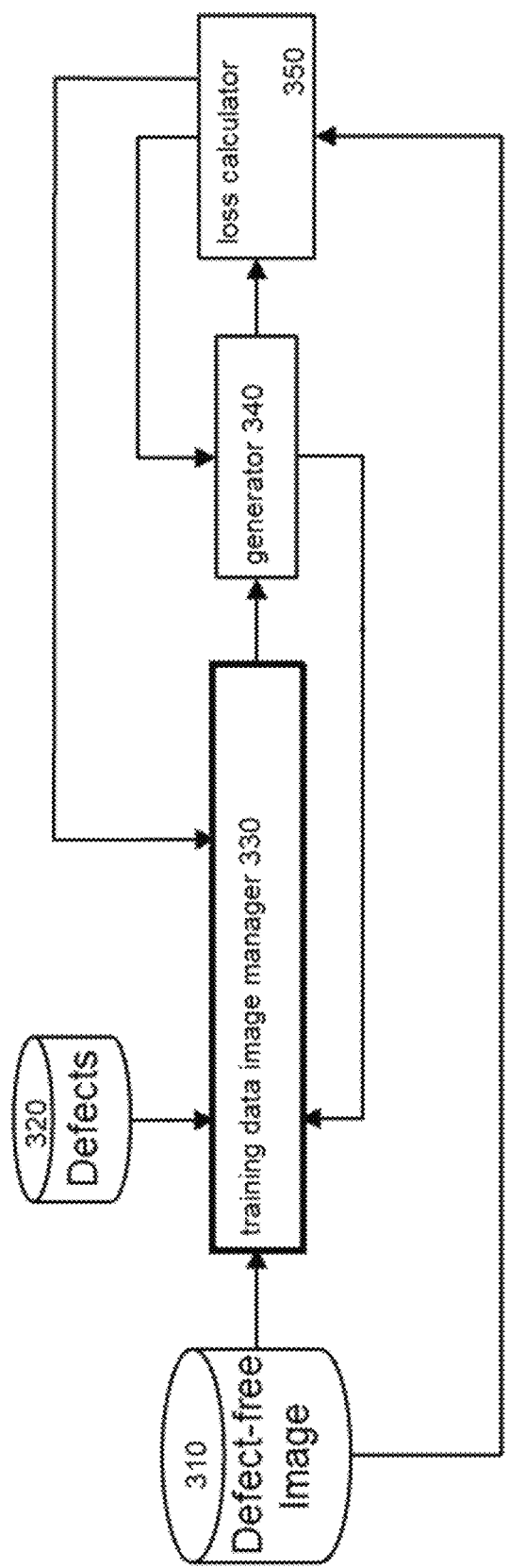
FIG. 3 illustrates a software architecture for executing the unsupervised training process.

An unsupervised training process exemplary of S101 is illustrated in FIG. 2. A software architecture for executing the unsupervised training process is illustrated in FIG. 3.

The software architecture comprises a first storage location 310 for storing the set of images of defect-free physical samples; a second storage location 320 for storing the defect image data; a training data image manager 330 for providing training data images from the set of images of defect-free physical samples and, when required, the defect image data; a generator neural network 340 to be trained in the training process to remove defects from input images; and a loss calculator 350 for calculating loss function values, that the training process seeks to minimise by appropriate configuration of adjustable parameters in the generator neural network 340. In this illustrative example, the software function responsible for determining how to configure the adjustable parameters of the generator neural network 340 based on the calculated losses, is part of the generator neural network 340 itself.

Defect image data may be composed of images purely of defects. That is, not a combination of defect and background. So, for example, adding 100 pixels of defect image data to a parent image is assumed to be adding 100 pixels worth of defect to the parent image. Defect image data may be composed of images shaped according to the defects that they represent, such as scratches, dents, etc., rather than square or rectangular width×height pixel images.

The training process is not reliant on ground truth labels (or other forms of indication) from human experts. The inputs to the unsupervised training process are a set of defect-free images of the physical samples, and defect image data which are superimposed onto defect-free images for input to the generator neural network. The defect-free images are real images, that is, images of real physical samples. S201 comprises acquiring a set of images of defect-free physical samples of the product or material. The acquired images of the defect-free physical samples are stored in the first storage location 310. The images may be completely defect-free, or may be sufficiently defect-free to be considered defect-free in the context in which the method is implemented. For example, in some contexts, an image that is 90%, 95%, 99%, or 100% free of defects may be considered defect-free.

The defect image data, which is images of defects, or anomalies, is stored in the second storage location 320. The defect image data comprises images of products or materials other than the product or material in the set of images of defect-free physical samples, and/or images of computer-generated textures or patterns, and/or images of defects on surfaces of the said product or material in the set of images of defect-free physical samples. The defect image data may be generic, that is, not tailored to the physical samples, or may be tailored to the physical samples. The defect image data may be random texture image data.

The defect image data is images of anomalies or defects that may be attached to the set of images of defect-free physical samples at S202. The defect image data may include zero, less than 10, or less than 20% (in area) image of defect-free physical samples (i.e. in some implementations defect image data may incorporate a small amount of defect-free image). The training data image manager 330 accesses the stored set of images of defect-free physical samples from the first storage location 310, and defect image data from the second storage location 320 (when required), to produce training data images for input to the generator neural network 340.

The training data image manager 330 may control one or more from among number, transparency, colour, size, and shape, of defect image data to attach to the parent images, in order to cause an amount of difference between the parent image and the training data image, which amount of difference is controlled according to a training condition such as number of completed training epochs.

The generator neural network 340 comprises an encoder 341 and a decoder 342. The generator neural network 340 may be an autoencoder comprising an encoder 341 and a decoder 342. Specifically, it may be a convolutional autoencoder. The convolutional autoencoder has a multilayer neural network architecture comprising one or more convolutional layers, followed by sub-sampling layers (pooling) and one or more fully connected layers. An example is a skip connection such as UNet (https://lmb.informatik.uni-freiburg.de/people/ronneber/u-net/).

The combination of the autoencoder 341 and decoder 342 realises the generator neural network 340. The decoder 342 effectively reverses the action of the autoencoder, since it takes a decoded representation of the input image and generates an image from the decoded representation. A role of the autoencoder is to extract features of images—in particular, the autoencoder is trained to extract the features of a defect-free image. The autoencoder restores input images and extracts features of input images. Skip connection such as UNet is an example of a functional part of an autoencoder.

Step S201 is performed once for the entire unsupervised training process. The same set of images of defect-free physical samples are used throughout, likewise the defect image data.

Step S202 is performed once per training epoch. A training epoch is a complete iteration through the images to be input to the generator neural network. At S202, training data images are synthesized for each epoch by superimposing, onto each member of the set of images of defect-free physical samples as a parent image, defect image data. The superimposing of defect image data onto the parent image causes an amount of difference between the (resultant) training data image and the (original) parent image. The amount of difference is non-zero, and is managed according to a training condition such as number of completed training epochs. In the initial training phase, step S202 is omitted. That is, in the initial training phase, the training data image manager 330 provides the images of defect-free physical samples directly to the generator neural network 340. In the first training phase, following the initial training phase, step S202 is performed once per training epoch, so that a new set of images for input to the generator neural network is generated each epoch. That is, in the first training phase, the training data image manager 330 superimposes defect image data from the second storage location 320 onto parent images from the first storage location 310 to produce training data images for input to the generator neural network

340. The superimposing of defect image data onto each parent image is controlled by the training data image manager 330 so that an amount of difference between the parent image and the resultant training data image (i.e. the result of the superimposing) increases as the number of completed training epochs increases, in accordance with a function. The generator neural network 340 is trained to remove the defect image data from the images (specifically, to replace the defect image data with normal state image data of the physical samples). The superimposing of defect image data is managed in a dynamic manner by the training data image manager 330, being dependent on a number of completed training epochs, specifically, increasing a delta between training data image and parent image in accordance with a training condition such as the number of completed training epochs.

The superimposing may comprise attaching defect image data at random or pseudo-random locations on the parent image. The amount of difference between each training data image and the respective parent image is caused by, in the synthesizing for each epoch by superimposing, onto each member of the set of images of defect-free physical samples as a parent image, increasing one or more from among: a number of defect images, a size of defect image, an amount of defect image data, a number of defect image pixels, an average pixel value difference between parent image and defect image, opacity of superimposed defect image data. The particular number/size/number of pixels of defect images may be controlled so that the amount of difference between each training data image and the respective parent image caused by the superimposed defect image data is increased from a minimum to a maximum as a function of a training condition such as a number of completed training epochs. The particular number/size/number/opacity of pixels of defect images may be a single values or a range of values, and is controlled by the training data image manager 330 according to a function which increases according to the number of completed training epochs. The defect image data may occur in individual images of a predetermined fixed size, or in varying sizes. The superimposing may include resizing defect image data to meet a specified size or number of pixels for superimposing on the parent image. The superimposing may preclude defect image data overlapping other defect image data.

In the initial training phase, the parent images, i.e. the set of images of defect free portions of the physical samples, are input to the generator in the absence of any defect image data. The initial training phase is optional. If included, the initial training phase may comprise one training epoch, or plural training epochs. The initial training phase enables the generator neural network to learn latent features corresponding to the normal condition or normal state of the physical samples.

At S203, the training data images for the respective epoch are reconstructed by the generator neural network 340, and the generator neural network 340 is trained to minimise a loss function (calculated by the loss calculator 350, for example) between each of the reconstructions of the synthesized training data images and the respective parent image. In the initial training phase, the training data images input to the generator neural network 340 are the images of defect-free physical samples. In the first training phase, the training data images input to the generator neural network 340 are the synthesized training data images, comprising defect image data superimposed on a respective parent image from the set of images of defect-free physical samples.

Figure 7B:
FIG. 7B illustrates the same parent image onto which defect image data has been superimposed.
Figure 7A:
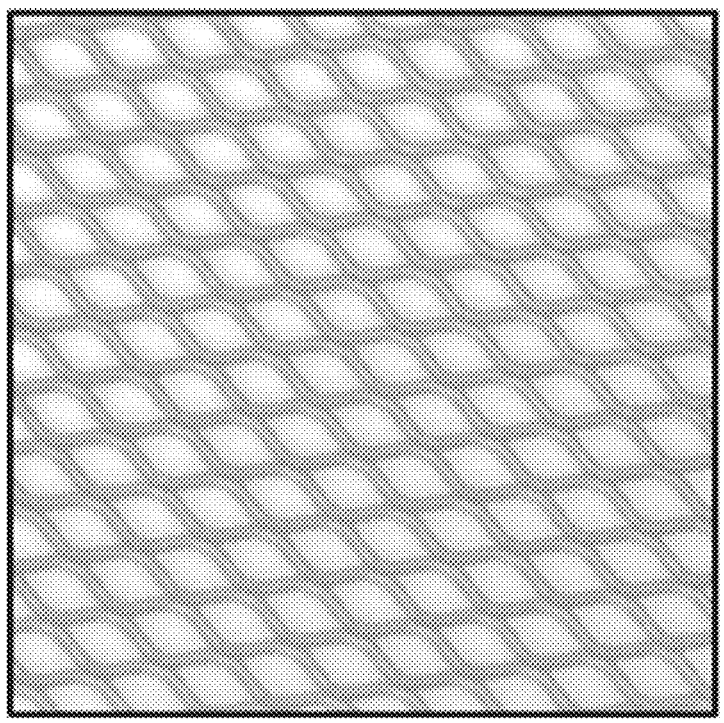
FIG. 7A illustrates a parent image.

The defect image data is a set of images of defects or anomalies (i.e. either randomised textures, actual defects or anomalies from physical samples, or CGI defects or anomalies) that are superimposed partially transparently (both the defect image data and the underlying parent image data are visible) onto the parent images (defect-free images of physical samples) to provide a set of training data images for each training epoch. The defect image data may also be superimposed onto the respective image as opaque image data. Optionally, the training data image manager 330 may control the level of opacity/transparency according to the number of completed training epochs, so that the level of opacity of the superimposed defect image data is controlled to increase as the number of completed training epochs increases. In other words, the level of opacity of any particular defect image is not a property of the image data itself, but is configurable by the training data image manager 330 at the superimposing. The level of opacity may be randomly assigned in the superimposing, or may be controlled to increase as the number of completed training epochs increases. Optionally, the level of opacity is determined by the defect image data itself, and is not configurable. FIG. 7A illustrates a parent image, that is, a member of the set of images of defect-free physical samples of a product or material (in this case a wire mesh), and FIG. 7B illustrates the same parent image onto which defect image data has been superimposed by the training data image manager 330. FIG. 7B is input to the generator neural network 340, which is being trained to remove the defect image data.

The generator neural network 340 (which may be referred to simply as the generator) comprises an encoder and a decoder. For example, the generator neural network 340 may comprise a convolutional autoencoder.

The output of the generator neural network 340 is a reconstructed version of the input image, or input images. In each training epoch, each member of the set of images of defect-free physical samples is input (with superimposed defect image data in the first training phase, and in the absence of defect image data in the initial phase) to the generator neural network 340 once, or more than once. For example, in the first training phase, two (or more) training data images may be synthesized from each member of the set of images of defect-free physical samples as a parent image, different defect image data being superimposed onto each of the two training data images. A training epoch is a cycle of each member of the set of defect-free images of physical samples being input to the generator at least once. So, if the training is configured so that each parent image is used to generate two different training data images, then the number of training data images in the training epoch is at least double the number of images in the set of defect-free images of physical samples.

As indicated by the arrows along the top of FIG. 2, at S204, a loss function is used to assess errors or differences between the reconstructed image output by the generator neural network 340, and the corresponding image of defect-free physical samples. In the software architecture of FIG. 3, a loss calculator 350 is illustrated as receiving input from the generator neural network 340 (the reconstructed image) and the first storage location 310 (the parent image i.e. the defect-free version of the reconstructed image). The output of the loss calculator 350 is a calculated value or vector of values representing the loss (i.e. the differences or errors) between the reconstructed image (or images) and the defect-free version of the image. The value or values are output to the generator neural network 340, or specifically to the software entity responsible for configuring the adjustable parameters (i.e. weights and biases) in order to minimise the loss function value or values.

In the initial training phase, the corresponding image of a defect-free physical sample of the product or material is the image that was input to the generator neural network 340 to generate the pertinent output image. In the first training phase, the corresponding image of a defect-free physical sample of the product or material is the parent image, i.e. the image from the set of images of defect-free physical samples to which defect image data was superimposed for input to the generator neural network 340 to generate the pertinent output image.

The goal of the training process illustrated in FIG. 2 is to minimise the loss function value or values by iteratively modifying adjustable parameters of the generator neural network 340. So, at S204, in response to the calculated loss function value, a trainer or other software entity modifies, i.e. reconfigures, adjustable parameters of the generator neural network 340. This process of image input, image output, loss function calculation, reconfiguration of adjustable parameters, continues until the end of the training process, which may be a predefined number of training epochs, or may be a convergence of the adjustable parameters to a settled configuration.

As the training process proceeds through the training process, the difference caused to the defect-free image by the superimposing of defect image data thereto (i.e. the images of defect-free physical samples) at S202 is increased. If an initial training phase is included in the training process, then there is zero defect image data superimposed in said phase. During the first training phase, the training data image manager 330 increases the amount of difference between each training data image and the respective parent (i.e. defect-free) image from a minimum to a maximum as a function of a training condition such as a count of a number of completed training epochs. The increase may be graded according to a linear function of the form y=mx+c, wherein y is the amount of difference, x is the count of completed training epochs (of the first training phase, or overall, depending on the implementation), c is the minimum amount (i.e. the amount to attach when the count of completed training epochs is zero), and m is the rate of increase per count. The increase may be controlled according to a step function, that increases by a predefined amount every n training epochs, wherein n is, for example, 1, 2, 5, or 10 (and the number of training epochs in the first training phase is, for example, at least 20, at least 50, at least 100, or at least 1000). The increase may be controlled according to a sigmoidal function.

The difference to cause to the defect-free image by superimposing defect image data thereto is controlled according to progress of the training process. Progress of the training process is represented by, and assessed according to, a training condition. The training condition is a variable and a series of thresholds against which the variable is assessed at the end of each training epoch.

The training condition may be a count of a number of completed training epochs, so that every one of or every n training epochs the amount of difference between the parent image and each training data image is increased. Alternatively, the training condition may be an average or aggregate over a training epoch of the loss function between each of the reconstructions of the synthesized training data images and the respective parent image of defect-free physical samples falling below a threshold value or one of a series of threshold values. A quantification of the loss function over the training epoch is compared with a first threshold, and once the first threshold is met, the amount of difference between the parent images and each training data image is increased (for the forthcoming training epoch), and a new threshold is set. The new threshold may be lower than the first threshold. This process continues for one or a plurality of new thresholds.

Alternatively the training condition may be adjustable parameters in the generator neural network changing by less than a threshold value among a series of threshold values between a start and end of the latest training epoch. That is, a quantification of the change in the adjustable parameters between the start and the end of the training epoch is compared with a first threshold, and once the first threshold is met, the amount of difference between the parent images and each training data image is increased (for the forthcoming training epoch), and a new threshold is set. The new threshold may be lower than the first threshold. This process continues for one or a plurality of new thresholds.

Alternatively the training condition may be an assessment of clarity of reconstructions of the synthesized training data images meeting a threshold value among a series of threshold values. That is, a quantification of an assessment of clarity of reconstructions of the synthesized training data images across the training epoch meeting a threshold value among a series of threshold values. The quantification is compared with a first threshold, and once the first threshold is met, the amount of difference between the parent images and each training data image is increased (for the forthcoming training epoch), and a new threshold is set. The new threshold may be lower than the first threshold. This process continues for one or a plurality of new thresholds.

Figure 4:
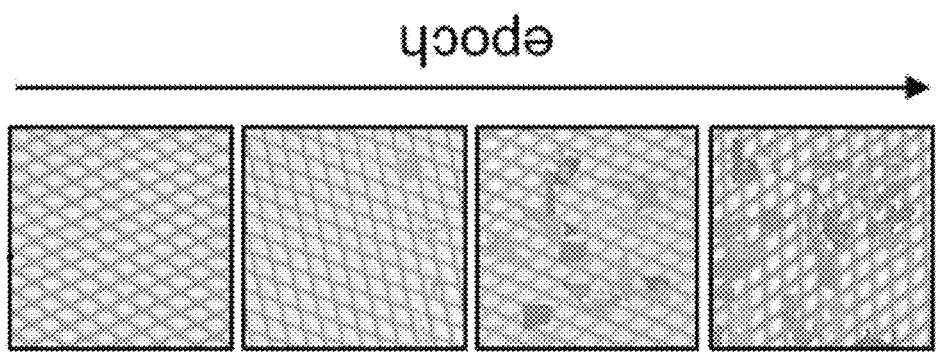
FIG. 4 illustrates control of superimposing of defect image data.
Figure 4:
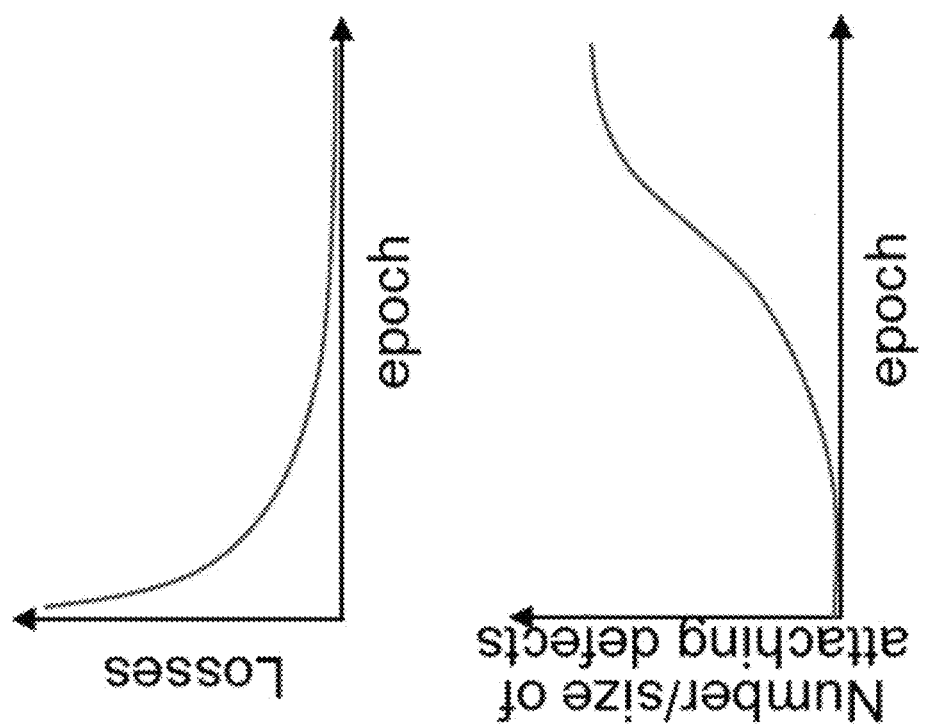

The difference between each parent image and the training data images produced therefrom is increased in dependence upon the training condition (i.e. as a function of the number of completed training epochs or as a function of some other quantity representing progress of the training). The increase may be controlled according to, for example, a sigmoid function, as illustrated schematically in FIG. 4. FIG. 4 also illustrates the fast decline in losses (i.e. loss function value) achieved by embodiments. Of course, the amount of difference may be defined by a range rather than a single value, however, the ends of the range may each be calculated according to a sigmoid function (i.e. max is f(e)+x, min is f(e)−x, wherein e is number of completed training epochs, and x is half of the acceptable range of amount of difference).

The defect image data may be stored in the second storage location 320 as individual images of the same size (in pixels) or of the same size to within a predefined range, for example, a predetermined size plus minus 5%, 10%, or plus minus 50 pixels, 100 pixels, or 500 pixels. The predetermined size may be, for example, 256 pixels, 512 pixels, 1024 pixels, 2048 pixels. Alternatively, the defect images may be sized or re-sized according to a size each image among the set of images of defect-free physical samples. For example, the defect images may be a predetermined percentage of the size of a single image from the set, the predetermined size being, for example, 1%, 2%, 3%, 4%, 5%, 10%, 12%, 15%.

The amount of difference between the parent image (from the set of defect-free images of physical samples) and its respective training data image or images may be increased each training epoch, or 1 in every n training epochs (wherein n is a positive integer equal to or greater than 2). The first training phase may be configured so that it does not finish before the maximum amount of difference has been reached. The maximum amount is a parameter that is controllable prior to beginning the training, and may be a number of pixels, a number of pixels and an average pixel value difference per pixel, or a metric aggregating pixel value difference over all pixels. The first training phase may continue, with the change from parent image to training data image at the maximum amount, for a predetermined number of training epochs, or until a convergence threshold is met.

The result obtained by the training phase S101, is a trained generator neural network 340. Specifically, the generator neural network 340 is trained to remove, or reduce the visual impact of, defects from images of physical samples of a material or product. Once the generator neural network is trained, the configurable parameters (i.e. the weights and biases) are effectively locked, or set, until a further training phase is undertaken. Further training may be performed periodically.

The generator neural network 340 is trained at S101 to regenerate an image (i.e. to regenerate the image) with defects (i.e. anomalies) removed. At S104 the reconstructed (i.e. regenerated) image is compared with the input image (i.e. the acquired live image) to identify defects. For example, the comparison may be based on the location of differences between pixel values of equivalent (i.e. equivalently located) pixels across the two versions of the image. The generator neural network 340 has a specific architecture, such as that of, or including that of, a convolutional autoencoder. The generator neural network 340 is configured to process an input image (either a training image of the physical samples or an acquired live image of the physical samples), to encode the input image to a latent space (encoded), and then to decode the image. The generator neural network 340 optimises to reconstruct the input image without anomalies or defects, owing to the training in S101.

Figure 5:
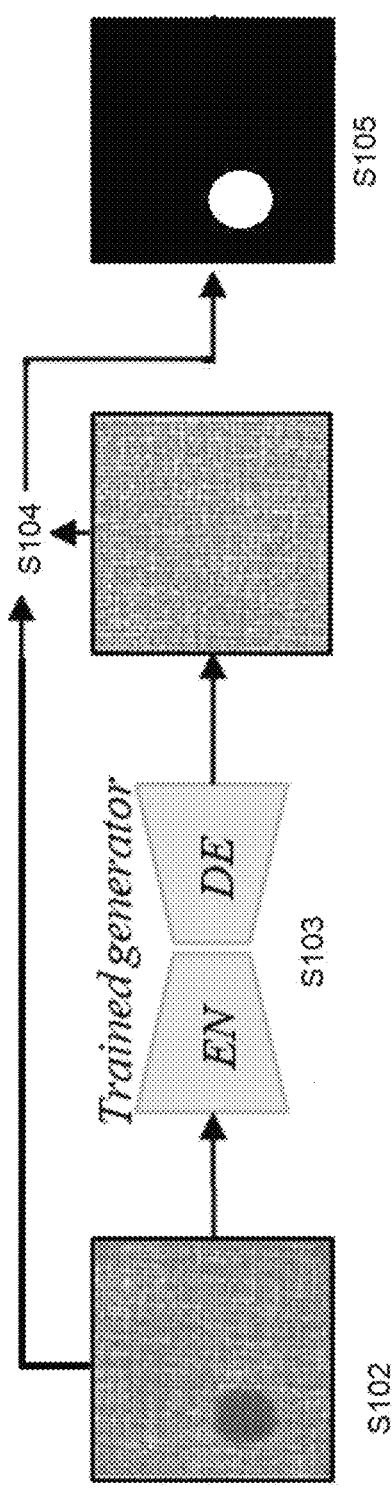
FIG. 5 illustrates image processing in a live phase.
Figure 6:
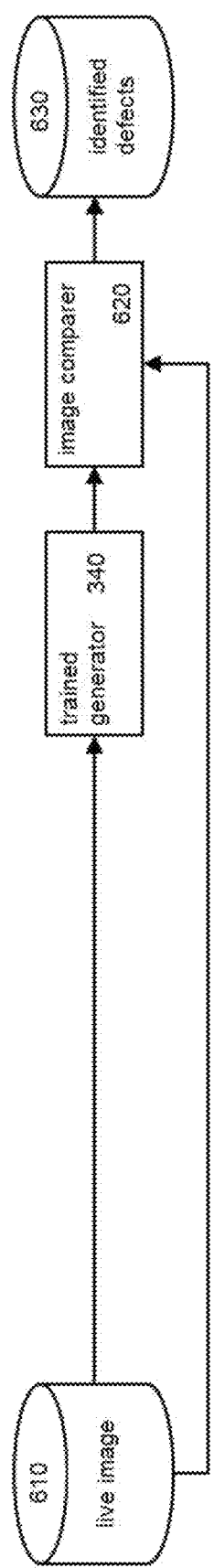
FIG. 6 illustrates a software architecture that may be used to implement the live phase.

The trained generator neural network is utilised in a live phase, or product testing phase. For example, the trained generator may be coupled with imaging equipment and a control console (such as a computer) in a manufacturing line environment, to identify defects on a manufactured material. The live phase comprises steps S102 to S105, which are illustrated in FIG. 1 to show their relation to the training phase S101, and are illustrated again in FIG. 5 to show additional detail. FIG. 6 illustrates a software architecture that may be used to implement the live phase.

FIG. 6 shows a third storage location 610 at which the acquire live image is stored; a trained generator neural network 340; an image comparer 620 for comparing the reconstructed version of the acquired live image with the acquired live image to identify differences; and a fourth storage location 620 at which an output is stored, in the form of a mask or other artefact identifying the location of the identified differences.

Step S102 comprises acquiring a live image of a physical sample of a product or material. The acquired live image may be stored at third storage location 610 for access by the trained generator 340, so that the act of storing the acquired live image at storage location 610 is effectively inputting the image to the trained generator neural network 340. The third storage location 610 may be, for example, managed as a queue of images for input to the trained generator neural network 340. For example, the live image may be an image of a surface of a physical sample, or the live image may be of the interior of a physical sample (as long as the training was also performed with surface images or interior images as appropriate). The physical sample is a material on (or in) which a user or operator wishes to identify the presence and/or location of any defects. The image may be acquired, for example, by one or more of: receipt over a network, reading from storage, an imaging process performed by imaging hardware. A live image is referred to as live because it is the input to the generator neural network 340 in a live phase of the generator neural network 340 (which can also be referred to as a test phase, a testing phase, or an implementation phase). The acquiring step S102 may include preprocessing of the image to a size and/or format required by the generator neural network 340.

A step S103 is performed after steps S102 and S101. Step S103 is performed after S101 since the generator neural network 340 has been trained by the time it processes the live image. However, it is noted that further training of the neural network 340 may be performed on an ongoing basis. At S103, the acquired live image is input to the generator neural network 340 to generate a reconstructed version of the live image, the reconstructed version being a defect-free or reduced-defect version of the acquired live image. For example, at S103 the trained generator neural network 340 is provided with the acquired live image as an input (which may have been pre-processed), and generates a new version of the acquired live image from which defects have been removed.

A step S104 is performed after step S103. At step S104, the reconstructed version of the live image, that is, the regenerated version of the acquired live image, is compared with the acquired live image to identify differences. For example, step S104 may be performed by the image comparer 620. It is noted that the acquired live image that is compared with the generated version of the acquired image may be the originally acquired version, or a pre-processed version thereof. Pre-processing may be carried out as part of S102, for example, to format the acquired image.

The comparison may be based on pixel values at equivalent pixel locations between the two versions of the image. The pixel values may be in one or more of RGB, or some other indicator of intensity at the pixel. The comparison therefore takes the form of a direct pixel-wise defect prediction.

The pixel values (for example, RGB, or intensity) at equivalent pixel locations across the two versions of the image are compared and the differences assessed. The difference may be represented as a reconstruction residual, which is a difference between the acquired live image and the reconstructed image generated by the trained generator neural network 340. That is, in the live phase, a reconstruction residual (which may be referred to as a residual error map) is produced with the use only of the trained generator neural network 340. The assessment may be an aggregation across a region (i.e. a number of local pixels), or a marking of a pixel location as different or not different between the two images based on the difference in pixel value being above or below a threshold. The threshold may be predefined or may be determined adaptively based on the differences across the entire image. For example, differences more than one standard deviation from the mean difference may be flagged as different. For differences to be detected as a defect, a condition may be applied, such as, more than X % of pixels in a region of minimum size Y pixels satisfy the difference threshold. The region may be grown until the percentage threshold ceases to be satisfied. Alternatively, a defect may be an unbroken region of differences greater than a minimum pixel size.

Based on the pixel locations of the differences, local differences (for example, unbroken regions of pixel locations flagged as different) are bound. For example, smart bounding boxes may be created around pixel locations of differences. Optionally, processing over the error may be applied to emphasise the differences if the image is to be presented to a user. Such processing may be, for example, smoothing, segmenting. Wherein, error is taken to mean pixel difference location.

Optionally, a mask highlighting the bound regions, is output so that a user can identify the location of defects or potential defects on the material surface. In FIG. 6, the output is stored at storage location 630. The output may be stored at a location for access by a user or some entity controlling the manufacturing process, or may be transmitted over a network, so that the storage at location 630 may be temporary (and only whilst transmission is pending). It is noted that the mask may not be output to a user, and may be used as a bitmap for processing purposes in order to map which regions to extract from the original image as defective or potentially defective regions. For example, the bound regions may be defined by using a thresholding method to automatically perform clustering-based image thresholding. An algorithm assumes that the image contains two classes of pixels following a bi-modal histogram (foreground pixels at locations of differences, and background pixels at locations of no difference), and then calculates a threshold separating the two classes so that their combined spread intra-class variance) is minimal, or equivalently (because the sum of pairwise squared differences is constant), so that their inter-class variance is maximum. From this thresholding the framework creates bounding boxes around every zone with an average value superior to the given thresholding method. Each bound region may be stored in association with a score representing likelihood of an anomaly at the region, which may be, for example, the sum of the error in the bound region.

Step S105 is performed after step S104. Step S105 comprises identifying defects on the physical samples surface at locations of the identified differences. Step S105 may be performed with reference to the acquired live image, for example, outputting (to a user, a console, a computer, or some other output destination) a version of the acquired live image with locations of the identified differences highlighted. Optionally, the output may be a mask highlighting the regions at which differences are identified (wherein a difference being identified may be based on a threshold level of pixel-wise difference between two versions of the same pixel). Alternatively, the method may comprise illuminating or otherwise highlighting directly the location(s) of differences on the physical samples itself. The comparison of S104 allows to identify the location of a defect, which defect can be output via display of a mask which allows an observer to easily identify the location of a defect on the physical samples.

Figure 8A:
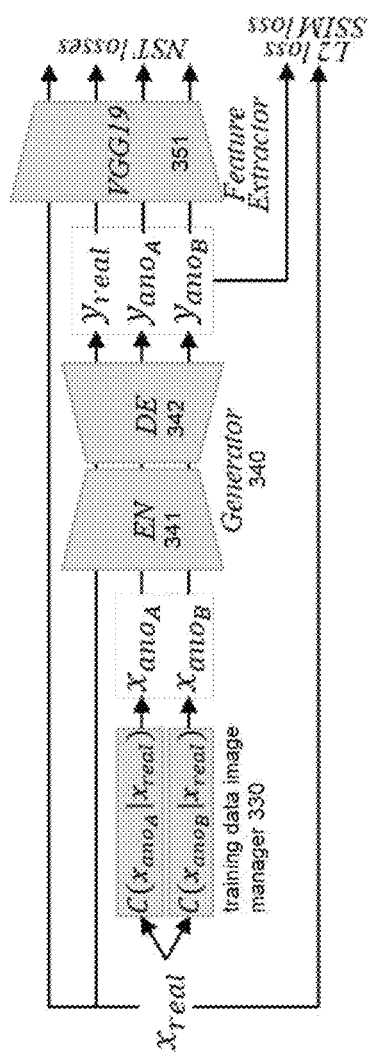
FIG. 8A illustrates image processing in a training phase.
Figure 8B:
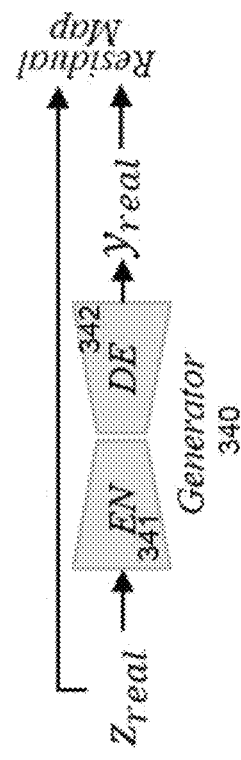
FIG. 8B illustrates image processing in a live phase.

FIG. 8A illustrates a particular example of some components of the architecture of FIG. 3. FIG. 8B illustrates a particular example of some components of the architecture of FIG. 5.

FIG. 8A also illustrates the processing of images by the training data image manager 330, the generator neural network 340, and the loss calculator 350, in the first training phase of the generator neural network 340. The images are indicated by the variables x and y, wherein x is an image that is input to the generator neural network 340, and y is an image that is output thereby (i.e. y is a reconstructed image). The subscripts (and the arrows) enable tracking of the images through the processing. The subscript real denotes the image is a real image of the physical samples from the set of images of defect-free physical samples. The subscripts anoA and anoB indicate new versions of a parent real image, produced by the training data image manager 330 by superimposing defect (or anomaly) image data onto the parent image. The training process iterates through the set of images of defect-free physical samples. The training data image manager 330 attaches defect image data to a parent image xreal with one or more from among transparency, size, shape, colour, number of images, number of pixels, amount of defect image data, being determined in dependence upon the number of completed training epochs, with the amount of image difference caused by the superimposing increasing as the number of completed training epochs increases. Different defect image data is used in producing xanoA than that which is used in producing xanoB. C indicates the processing by the training data image manager 330 in producing the training data images xanoA and xanoB from the corresponding parent image xreal. xanoA and xanoB are different training data images produced from the same parent image xreal.

In the example of FIG. 8A, two training data images xanoA and xanoB are produced from each parent image xreal. xanoA and xanoB are training data images, and are different by virtue of having different defect image data superimposed onto them by the training data image manager 330. In the context of the first training phase, xreal is not strictly considered a training data image (xreal is used as a training data image in the initial training phase, in which no defect image data is superimposed). However, xreal is input to the generator neural network 340 in order that its corresponding reconstruction, yreal, can be used in calculating loss function values by the loss calculator 350. FIG. 8A illustrates the processing of a single parent image xreal in the first training phase. The process is repeated for each member of the set of images of defect-free physical samples as a parent image xreal in each training epoch (a training epoch being defined as such).

The generator neural network 340 is a convolutional autoencoder (or may be referred to as a convolutional autoencoder generator), which includes an encoder 341 and a decoder 342. In the example of FIG. 8A, the convolutional autoencoder generator leverages a triplet network. Triplet networks are described in more detail in: Elad Hoffer and Nir Ailon; Deep metric learning using triplet network; International Workshop on Similarity—Based Pattern Recognition, pages 84-92; Springer, 2015. The generator neural network 340 reconstructs input images, and outputs them to a loss calculator 350. The generator neural network 340 is reconfigured (i.e. its adjustable weights and parameters modified) in dependence upon the loss values calculated by the loss calculator 350. In the example of FIG. 8A, the loss calculator 350 includes a feature extractor 351. The feature extractor 351 may be, for example, a VGG19 feature extractor.

The three reconstructed images yi (i=real, anoA, anoB) are compared against the parent image xreal via loss functions. The loss functions may include, for example, one or more from among: L2, NST, and SSIM losses. The reconstructed images are passed through a VGG19 network (described in more detail at Leon A Gatys, Alexander S Ecker, and Matthias Bethge. A neural algorithm of artistic style. arXiv preprint arXiv:1508.06576, 2015) and the neural style transfer (NST) loss is calculated on the resultant output feature maps. VGG19 in this case acts as a feature extractor, not a discriminator. The combination of losses calculated in the training process enables the generator neural network to reconstruct the acquired live image zreal, without defects, in the live phase, and obtain the residual error map.

An exemplary loss function calculator 350 may calculate a combination of loss function values, as shown in equation (1). Each loss has its own weight. Firstly, the $L_2$ loss which is shown in (2) and (3), wherein (3) the difference is only computed on the mask area (area of the artificially attached defects). Secondly, the inverse SSIM loss in (4) takes the mean difference between input and reconstructed images. Lastly, the combination of content (6) and style (7) losses for NST in (5) using a pre-trained (on ImageNet) VGG19 network. Style loss is calculated from the Gram matrices for the ReLU activated feature maps output. Content loss is the mean square error of features between xreal and yi on the same layers as style loss.

$$\mathcal{L}_{total} = \lambda_{L_2}\mathcal{L}_{L_2} + \lambda_{ano}\mathcal{L}_{L_2 ano} + \lambda_s \mathcal{L}_{ssim} + \lambda_n \mathcal{L}_{nst} \quad (1)$$

$$\mathcal{L}_{L_2} = \left[\sum_{i \in [real, ano_A, ano_B]} |x_{real} - \mathcal{Y}_i|^2\right]^{\frac{1}{2}} \quad (2)$$

$$\mathcal{L}_{L_2 ano} = \left[\sum_{i \in [ano_A, ano_B]} (x_{mask_i} \times |x_{real} - \mathcal{Y}_i|)^2\right]^{\frac{1}{2}} \quad (3)$$

$$\mathcal{L}_{ssim} = \frac{1}{3}\left[\sum_{i \in [real, ano_A, ano_B]} 1 - SSIM(x_{real}, \mathcal{Y}_i)\right] \quad (4)$$

$$\mathcal{L}_{nst} = \alpha \mathcal{L}_{cont} + \beta \mathcal{L}_{style} \quad (5)$$

$$\mathcal{L}_{cont} = \sum_{i \in [real, ano_A, ano_B]} \sum_l [VGG(x_{real})^l - VGG(\mathcal{Y}_i)^l] \quad (6)$$

$$\mathcal{L}_{style} = \sum_{i \in [real, ano_A, ano_B]} \sum_l w^l [VGG(x_{real})^l - VGG(\mathcal{Y}_i)^l] \quad (7)$$

FIG. 8B illustrates a live image of physical samples zreal being processed by the trained convolutional autoencoder 340 to produce the reconstructed version yreal of the live image zreal. A residual map is produced by comparing zreal and yreal. On the basis of the residual error map, any defects in zreal are identifiable.

In a worked example, the MVTec AD dataset is used as the set of images of defect-free physical samples, which has 15 different categories split into textures and objects from real-world applications. At a preprocessing step, the images are resized and normalised to 256×256 pixels. In certain categories, the images can be rotated (0, 90, 180, 270 degrees), and flipped. The set of images have artificial defects superimposed onto them by the training data image manager 330 during a first training phase. The flipping and rotating may not be applied to every category since cable, capsule, pill, toothbrush, transistor and zipper have a stationary position and are not flipped or rotated. Specifically, this is avoided in order to not change any of these embedded stationary features. Similarly, this can occur in manufacturing production-lines where the products remain stationary. A different generator neural network 340 is trained for each category, with each category corresponding to a particular product or material.

The training is implemented in PyTorch. A set of eight 256×256 images is used for training the network. The model is optimised using the ADAM optimiser with learning rate=2×10−4, $\beta_1$=0.5, $\beta_2$=0.999, eps=10-8, weight decay=0 and amsgrad=False.

The training data image manager 330 manages the amount of difference between a defect-free image and the training data image synthesized therefrom by superimposing defect image data. For example, the amount of difference may be managed by controlling a number of defects to attach to the set of images of defect-free samples of the particular product or material. In this particular example, the number of defects increases by 1 every epoch for 50 epochs, from 0 to 50. The first training phase continues up to 100 epochs, but once the maximum number of defects is reached, it remains static for the remaining training epochs.

As an output of the image comparer 620 in the live phase, a residual map is computed when calculating the difference between an input and a reconstructed image. Blurring with window size of 11 is used to get rid of noise. Finally, Area Under the Curve (AUC) is computed by calculating True Positive Rate (TPR), False Positive Rate (FPR), and Receiver Operating Characteristics (ROC) curve with pixel-wise thresholds of 0-255 range.

Figure 9:
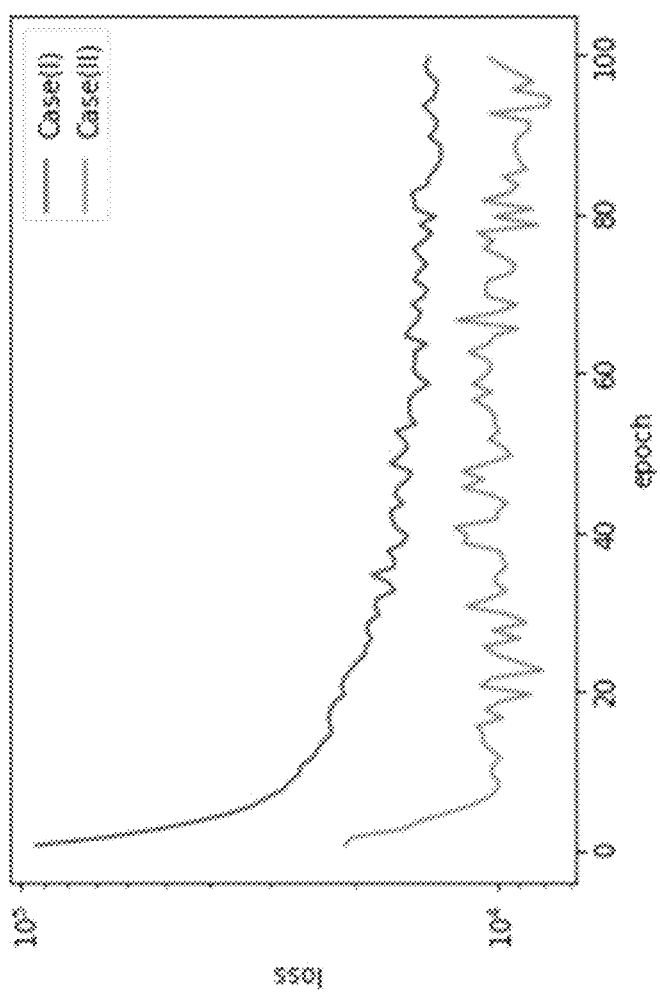
FIG. 9 compares training losses achieved with a worked example of an embodiment, with those achieved by a previous technique.

FIG. 9 illustrates training losses with a previous technique and the worked example using MVTec grid dataset. Case(I) is a previous technique, which attached constantly 50 defects without dependence on number of completed training epochs, and Case (II) is the worked example. As it shows, Case(II) is faster to decrease losses. Over 50 epochs, the loss in Case (II) is lower that Case (I) though both cases attached same number of defects (50 defects).

FIG. 10 shows numeric results of AUC with the worked example compared with state of the art trained generator neural networks. Prior art A is a CAE(SSIM) according to Paul Bergmann, Sindy Lowe, Michael Fauser, David Sattlegger, and Carsten Steger; Improving unsupervised defect segmentation by applying structural similarity to autoencoders; arXiv preprint:1807.02011, 2018; and prior art B is a CAE(I2) according to the same document. Prior art C is an AnoGAN according to T. Schlegl, P. Seebock, S. Waldstein, U. Schmidt-Erfurth, and G. Langs; Unsupervised anomaly detection with generative adversarial networks to guide marker discovery; International Conference on IPMI, pages 146-157; Springer, 2017. The worked example outperforms the prior art with any category from the dataset. A threshold of 5% for FPR rate is used in these results. The worked example successfully reconstructs input images without any defects, and without blurring or collapse.

Figure 11:
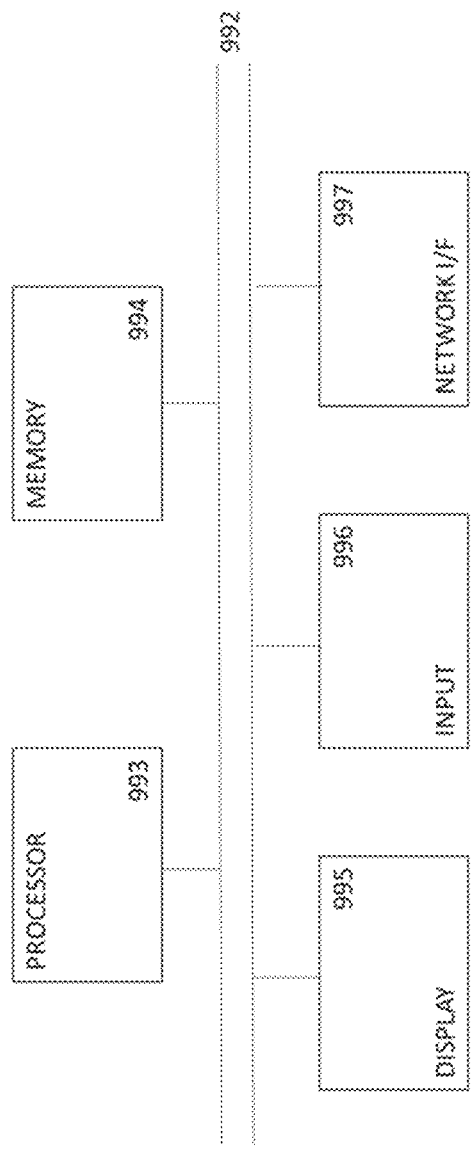
FIG. 11 is a block diagram of a hardware configuration of an embodiment.

FIG. 11 is a block diagram of a computing device, such as a computing apparatus or server, which embodies the present invention, and which may be used to implement a method of processing images of material surfaces to identify defects on the imaged material surface, such as illustrated in FIGS. 1, 2, 3, 5, & 6. The computing device comprises a processor 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992. The computing device may include or be in data communication with an imaging device, such as a camera, for acquiring images of material surfaces.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different steps of FIGS. 1, 2, 3, 5, & 6 described here and in the claims. The processor 993 may include a GPU (graphics processing unit) adapted to implement one or more neural networks, such as the generator neural network 340. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIVV) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device such as that illustrated in FIG. 11. Such a computing device need not have every component illustrated in FIG. 11, and may be composed of a subset of those components. A method embodying the present invention may be carried out by a single computing device in communication with one or more data storage servers via a network. The computing device may be a data storage itself storing the trained generator neural network 340, and the output identification of the defects from the acquired live image.

A method embodying the present invention may be carried out by a plurality of computing devices operating in cooperation with one another. One or more of the plurality of computing devices may be a data storage server storing at least a portion of the trained generator neural network 340, and the output identification of the defects from the acquired live image.

The training data image manager 330 of FIGS. 3 & 8A may be a processor 993 (or plurality thereof) executing processing instructions (a program) stored on a memory 994 and exchanging data via a network I/F 997. In particular, the processor 993 executes processing instructions to receive, via the network I/F or otherwise, an image from the set of images of defect-free physical samples from a first storage location 310, and superimposes defect image data from storage location 320, an amount of difference caused by the superimposing being determined according to a function that increases as the number of completed training epochs increases, as in step S202 of FIG. 2. Furthermore, the processor 993 may execute processing instructions to store training data images so produces on a connected storage unit and/or to transmit, via the network I/F 997 or otherwise, training data images to the generator neural network 340 for processing thereby.

The generator 340 of FIGS. 2, 3, 5, 6, 8A, and 8B may be a processor 993 (or plurality thereof) executing processing instructions (a program) stored on a memory 994 and exchanging data via a network I/F 997. In particular, the processor 993 executes processing instructions to receive, via the network I/F or otherwise, input images from the training data image manager 330 in a first training phase, or directly from a first storage location 310 in an initial training phase, or from a third storage location 610 in a live phase, and generates a defect-free version of the input image, as in step S103 of FIG. 1, and step S203 of FIG. 2. Furthermore, the processor 993 may execute processing instructions to store the reconstructed version of the input image on a connected storage unit and/or to transmit, via the network I/F 997 or otherwise, the reconstructed version of the input image to a loss calculator 350 for comparison with a image of defect-free physical sample in a training phase, or to an image comparer 620 for comparison with an acquired live image in a live phase.

The loss calculator 350 of FIG. 3 may be a processor 993 (or plurality thereof) executing processing instructions (a program) stored on a memory 994 and exchanging data via a network I/F 997. In particular, the processor 993 executes processing instructions to receive, via the network I/F or otherwise, a parent image, that is a member of the set of images of defect-free physical samples from a first storage location 310, and a reconstructed version of the training data images from the generator neural network 340, and to calculate a value of one or more loss functions to represent the error or loss introduced by the generator 340, as in step S204 of FIG. 2. Furthermore, the processor 993 may execute processing instructions to store the calculated loss values on a connected storage unit and/or to transmit, via the network I/F 997 or otherwise, the calculated loss value or values to the generator neural network 340 for configuration of the adjustable parameters thereof in a training phase.

The image comparer 620 of FIG. 6 may be a processor 993 (or plurality thereof) executing processing instructions (a program) stored on a memory 994 and exchanging data via a network I/F 997. In particular, the processor 993 executes processing instructions to receive, via the network I/F or otherwise, the acquired live image from the third storage location 610, and the reconstructed version of the acquired live image from the trained generator neural network 340 and generate a residual map identifying differences between the two, as in steps S104 and S105 of FIG.

1. Furthermore, the processor 993 may execute processing instructions to store the residual map on a connected storage unit and/or to transmit, via the network I/F 997 or otherwise, the residual map to a console or computer of an operator of a production line.

The invention claimed is:

1. A computing apparatus comprising processor hardware and memory hardware, the memory hardware storing processing instructions which, when executed by the processor hardware, cause the processor hardware to process images of a subject physical sample of a product or material to identify defects on the imaged physical samples, by executing a process comprising:
   executing unsupervised training of a generator neural network to generate defect-free reconstructions of input images;
   acquiring a live image of the subject physical sample;
   inputting the live image to the trained generator neural network to generate a defect-free reconstruction of the live image from which a defect is removed;
   comparing the defect-free reconstruction of the live image with the acquired live image to determine a difference; and
   identifying a defect corresponding to the subject physical sample at a location of the determined difference;
   wherein, the unsupervised training includes:
      acquiring a set of images from the input images corresponding to the subject defect-free physical sample;
      executing a training phase including a plurality of training epochs, at each training epoch:
         synthesizing training data images by superimposing, onto each member of the set of images of the subject defect-free physical sample as a respective parent image, defect image data;
         reconstructing the synthesized training data images by the generator neural network,
         the generator neural network being iteratively trained to,
            minimize a loss function between each reconstruction of the reconstructing of the synthesized training data images and the respective parent image of defect-free physical sample, and
            increase an amount of difference between a training data image of the training data images and the respective parent image caused by the superimposed defect image data from a minimum to a maximum as a function of a training condition.

2. The computing apparatus according to claim 1, wherein the unsupervised training further comprises:
   an initial training phase, comprising one or more epochs and preceding the training phase, in which training data images for the initial training phase include each member of the set of images of the defect-free physical sample.

3. The computing apparatus according to claim 2, wherein the initial training phase comprises:
   the generator neural network reconstructing the training data images for the initial training phase, the generator neural network being iteratively trained to minimise a loss function between each of the training data images for the initial training phase and the respective reconstruction.

4. The computing apparatus according claim 1, wherein the amount of difference between each training data image and the respective parent image is at the maximum for plural training epochs among the plurality of training epochs.

5. The computing apparatus according to claim 1, wherein the function is a sigmoidally increasing function or a linearly increasing function.

6. The computing apparatus according to claim 1, wherein the amount of difference between the training data image and the respective parent image is caused by, in the synthesizing at each epoch to superimpose, onto each member of the set of images of defect-free physical samples as the respective parent image, increasing any one or combination of: a number of defect images, a size of defect image, an amount of defect image data, a number of defect image pixels, an average pixel value difference between parent image and defect image, opacity of superimposed defect image data.

7. The computing apparatus according to claim 1, wherein the defect image data comprises any one or combination of:
   images of products or materials other than the product or material in the set of images of the defect-free physical sample;
   images of computer-generated textures or patterns; and
   images of defects on surfaces of the product or material in the set of images of the defect-free physical sample.

8. The computing apparatus according to claim 1, wherein the defect image data is partially transparent when superimposed onto the respective parent image.

9. The computing apparatus according to claim 1, wherein the generator neural network is a convolutional autoencoder.

10. The computing apparatus according to claim 1, wherein, in each training epoch:
   two training data images are synthesized from each member of the set of images of defect-free physical samples as a parent image, different defect image data being superimposed onto each of the two training data images;
   the iterative training of the generator neural network comprises, for each parent image, inputting the parent image and the two respective training data images to the generator neural network for reconstruction thereby, the loss function being an aggregation of a plurality of factors, including a first factor, a second factor, and a third factor, the first factor being proportional to a calculated value of a first loss function between the parent image and the reconstructed parent image, the second and third factors being proportional to a calculated value of a second loss function between the parent image and each of the reconstructed training data images, respectively;
   wherein the first loss function and the second loss function are either the same loss function, or different loss functions.

11. The computing apparatus according to claim 10, wherein each of the first and second loss functions is at least one of a quantitative assessment of a loss between the respective pair of images, and an aggregation of a plurality of different quantitative assessments of a loss between the respective pair of images.

12. The computing apparatus according to claim 1, wherein the training condition is any one or combination of:
   an increase in a count of a number of completed training epochs;
   an average or aggregate over a training epoch of the loss function between each of the reconstructions of the synthesized training data images and the respective parent image of defect-free physical samples falling below a threshold value among a series of threshold values;

adjustable parameters in the generator neural network changing by less than a threshold value among a series of threshold values between a start and end of the latest training epoch;

an assessment of clarity of reconstructions of the synthesized training data images meeting a threshold value among a series of threshold values.

13. The computing apparatus according to claim 1, further comprising imaging hardware for acquiring the live image, and a display on which the location of the determined difference at which the defects is identified is displayed.

14. A method of processing images of a subject physical sample to identify a defect on the imaged physical sample, the method comprising:

by a processor hardware coupled to a memory,
  executing unsupervised training of a generator neural network to generate defect-free reconstructions of input images;
  acquiring a live image of the subject physical sample;
  inputting the live image to the trained generator neural network to generate a defect-free reconstruction of the live image from which a defect is removed;
  comparing the defect-free reconstruction of the live image with the acquired live image to determine a difference; and
  identifying a defect corresponding to the subject physical sample at a location of the determined difference;
  wherein, the unsupervised training includes:
    acquiring a set of images from the input images corresponding to the subject defect-free physical sample;
    executing a training phase including a plurality of training epochs, at each training epoch:
      synthetizing training data images by superimposing, onto each member of the set of images of the subject defect-free physical sample as a respective parent image, defect image data;
      reconstructing the synthesized training data images by the generator neural network,
      the generator neural network being iteratively trained to,
        minimize a loss function between each reconstruction of the reconstructing of the synthesized training data images and the respective parent image of defect-free physical sample, and
        increase an amount of difference between a training data image of the training data images and the respective parent image caused by the superimposed defect image data from a minimum to a maximum as a function of a training condition.

15. A non-transitory computer-readable medium, storing processing instructions which, when executed by a computing apparatus comprising memory hardware and processing hardware, cause the computing apparatus to process images of a subject physical sample of a product or material to identify defects on the imaged physical samples, by executing a process comprising:

executing unsupervised training of a generator neural network to generate defect-free reconstructions of input images;
acquiring a live image of the subject physical sample;
inputting the live image to the trained generator neural network to generate a defect-free reconstruction of the live image from which a defect is removed;
comparing the defect-free reconstruction of the live image with the acquired live image to determine a difference; and
identifying a defect corresponding to the subject physical sample at a location of the determined difference;
wherein, the unsupervised training includes:
  acquiring a set of images from the input images corresponding to the subject defect-free physical sample;
  executing a training phase including a plurality of training epochs, at each training epoch:
    synthetizing training data images by superimposing, onto each member of the set of images of the subject defect-free physical sample as a respective parent image, defect image data;
    reconstructing the synthesized training data images by the generator neural network,
    the generator neural network being iteratively trained to,
      minimize a loss function between each reconstruction of the reconstructing of the synthesized training data images and the respective parent image of defect-free physical sample;
      increase an amount of difference between a training data image of the training data images and the respective parent image caused by the superimposed defect image data from a minimum to a maximum as a function of a training condition.

* * * * *